US012612111B2

(12) United States Patent
Lee et al.

(10) Patent No.: US 12,612,111 B2
(45) Date of Patent: Apr. 28, 2026

(54) REAR VEHICLE BODY STRUCTURE

(71) Applicants: Hyundai Motor Company, Seoul (KR); Kia Corporation, Seoul (KR)

(72) Inventors: HaeHoon Lee, Seoul (KR); ChangHak Kang, Hwaseong-si (KR); Sang Kyoung Han, Gunpo-si (KR); Youngrock Kim, Gwangmyeong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 380 days.

(21) Appl. No.: 18/340,211

(22) Filed: Jun. 23, 2023

(65) Prior Publication Data

US 2023/0331310 A1 Oct. 19, 2023

(30) Foreign Application Priority Data

Oct. 17, 2022 (KR) ........................ 10-2022-0133536

(51) Int. Cl.
*B62D 25/02* (2006.01)
*B62D 25/04* (2006.01)

(52) U.S. Cl.
CPC ........... *B62D 25/025* (2013.01); *B62D 25/04* (2013.01)

(58) Field of Classification Search
CPC ...... B62D 25/025; B62D 25/04; B62D 25/08; B62D 25/02; B62D 27/023; B60Y 2306/01
USPC .... 296/209, 193.06, 29, 30, 193.05, 203.01, 296/4
See application file for complete search history.

(56) References Cited

U.S. PATENT DOCUMENTS 9,387,889 B2 * 7/2016 Ayuzawa ............... B62D 21/11
2010/0207426 A1 * 8/2010 Tsuruta .............. B62D 25/2036
296/205

FOREIGN PATENT DOCUMENTS

CA 3113734 A1 * 10/2021 ............... B60J 5/06
JP H09290775 A * 11/1997
JP 2010143461 A * 7/2010

OTHER PUBLICATIONS

CA3113734 Text (Year: 2021).*
JP2010143461 Text (Year: 2010).*
JPH09290775 Text (Year: 1997).*

* cited by examiner

*Primary Examiner* — Amy R Weisberg
(74) *Attorney, Agent, or Firm* — Slater Matsil, LLP

(57) ABSTRACT

An embodiment rear vehicle body structure includes a side sill including a sill inner member and a sill outer member connected to each other, the side sill extending along a front to rear direction of the vehicle body at a lower portion of a side body, a sill rear inner member connected to a rear portion of the sill inner member along the front to rear direction of the vehicle body, a sill rear outer member connected to a rear portion of the sill outer member along the front to rear direction of the vehicle body and connected to the sill rear inner member along a vehicle width direction, and a pillar reinforcement member connected to the sill rear outer member and disposed along a vertical direction of the vehicle body.

20 Claims, 11 Drawing Sheets

REAR VEHICLE BODY STRUCTURE

CROSS-REFERENCE TO RELATED APPLICATIONS

This application claims the benefit of Korean Patent Application No. 10-2022-0133536, filed on Oct. 17, 2022, which application is hereby incorporated herein by reference.

TECHNICAL FIELD

The present invention relates to a vehicle body.

BACKGROUND

Recently, the vehicle industry is introducing a new concept of future mobility vision for realizing a human-centered, dynamic future city. One of these future mobility solutions is a purpose built vehicle (PBV) as a purpose-based mobility.

The PBV is an electric vehicle-based (EV) environment-friendly vehicle that provides various customized services to users. The vehicle body of such a PBV includes an under body (also referred to as a rolling chassis or a skateboard in the art) and an upper body assembled to the under body.

Here, the upper body may be configured in various forms according to the type of customized service of the PBV. Furthermore, the upper body has side bodies on both sides along the vehicle width direction.

The side bodies on both sides have a plurality of pillars connected along the vertical direction to the side sill to protect the occupant while supporting the overall strength of the vehicle body during a frontal collision, rear collision, and side collision.

Therefore, the side body on both sides must have a characteristic capable of effectively distributing the load input to the front, rear, and side directions of the vehicle body while securing the combined strength of the side sill and the plurality of pillars.

Matters described in this background art section are prepared to enhance understanding of the background of embodiments of the invention and may include matters other than conventional art already known to a person of an ordinary skill in the field to which this art belongs.

SUMMARY

The present invention relates to a vehicle body. Particular embodiments relate to a rear vehicle body structure for a purpose built vehicle (PBV).

Embodiments of the present disclosure provide a rear vehicle body structure capable of effectively distributing a load input to a side sill while securing rigidity of a lower part of a side structure.

A rear vehicle body structure according to an exemplary embodiment of the present invention may include a side sill that includes a sill inner member and a sill outer member connected to each other and is disposed on both sides of a vehicle body along the front to rear directions of the vehicle body at a lower portion of a side body along the vehicle width direction, a sill rear inner member connected to a rear portion of the sill inner member along the front to rear directions of the vehicle body, a sill rear outer member connected to a rear portion of the sill outer member along the front to rear directions of the vehicle body and connected to the sill rear inner member along the vehicle width direction, and a pillar reinforcement member connected to the sill rear outer member and disposed along the vertical direction of the vehicle body.

The sill rear inner member, the sill rear outer member, and the pillar reinforcement member may be multiply connected along the width direction, the front to rear direction, and the vertical direction of the vehicle body.

The rear vehicle body structure according to an exemplary embodiment of the present invention may further include a rear cross member connected to the sill rear inner member along the vehicle width direction.

The rear vehicle body structure according to an exemplary embodiment of the present invention may further include a rear pillar panel connected to an upper portion of the rear portion of the sill inner member and an upper portion of the sill rear inner member and connected to the pillar reinforcement member along the vehicle width direction.

The rear vehicle body structure according to an exemplary embodiment of the present invention may further include a rear wheel arch member connected to the sill rear inner member and the sill rear outer member.

The sill rear outer member may include a forming part formed on the rear portion thereof to be connected with the rear wheel arch member.

The sill rear inner member and the sill rear outer member may be connected to form a closed cross-section.

The sill rear outer member and the pillar reinforcement member may be connected to form a closed cross-section.

The rear portion of the sill inner member and the front portion of the sill rear inner member may be connected through a first overlap portion overlapping each other along the vehicle width direction.

The rear portion of the sill outer member and the front portion of the sill rear outer member may be connected through a second overlap portion overlapping each other along the vehicle width direction.

The first overlap portion and the second overlap portion may be connected to each other along the vehicle width direction.

The rear portion of the sill rear inner member and the lower portion of the rear wheel arch member may be connected through a third overlap portion overlapping each other along the vehicle width direction.

The rear part of the sill rear outer member and the rear part of the pillar reinforcement member may be connected through a fourth overlap portion overlapping each other along the vehicle width direction.

The third overlap portion and the fourth overlap portion may be connected to each other along the vehicle width direction.

The sill rear inner member, the sill rear outer member, and the pillar reinforcement member may form a double closed cross-section shape along the vehicle width direction.

The sill rear inner member and the sill rear outer member may be connected to form a first closed section.

The sill rear outer member and the pillar reinforcement member may be connected to form a second closed section.

On both sides of the vehicle, the first closed section and the second closed section each may be partitioned and formed in a shape in which the sill rear outer member is disposed between the sill rear inner member and the pillar reinforcement member.

The rear vehicle body structure according to an exemplary embodiment may improve the strength and connectivity of the rear part of the side sill and improve the crash performance of the PBV.

In addition, effects that can be obtained or predicted by exemplary embodiments should be directly or implicitly disclosed in the detailed description of the exemplary embodiment. That is, various effects predicted according to exemplary embodiments will be disclosed within a detailed description to be described later.

BRIEF DESCRIPTION OF THE DRAWINGS

Since these drawings are for reference in explaining exemplary embodiments of the present invention, the technical idea of embodiments of the present invention should not be construed as being limited to the accompanying drawings.

FIG. 1 is a side view illustrating an upper body for a PBV to which a rear vehicle body structure according to an exemplary embodiment is applied.

Figure 2:
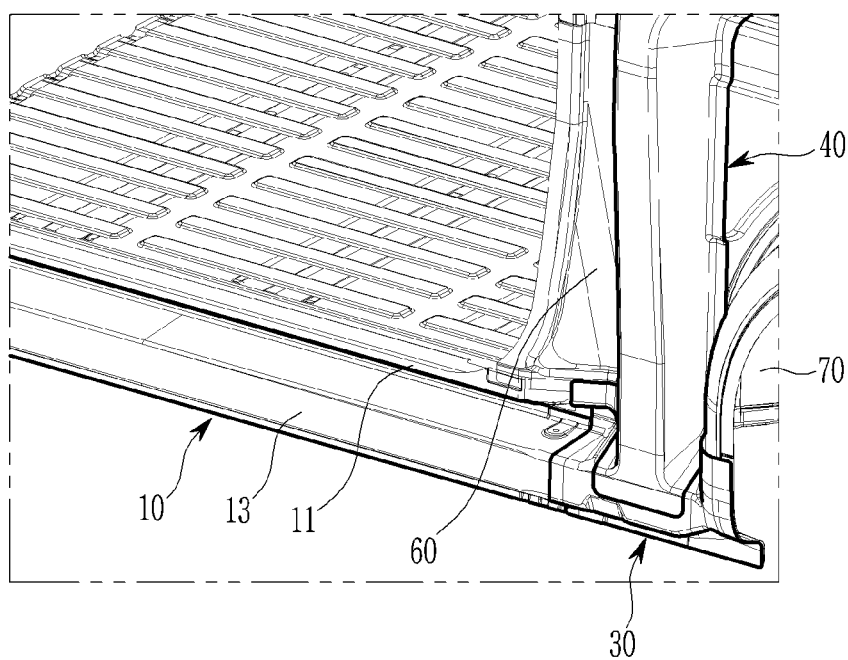
FIG. 2 is a perspective view showing a rear vehicle body structure according to an exemplary embodiment.

The drawings referenced above are not necessarily drawn to scale, but should be understood as presenting rather simplified representations of various preferred features illustrating the basic principles of embodiments of the present invention. Certain design features of embodiments of the present invention, including, for example, particular dimensions, orientations, locations, and shapes, will be determined in part by the particular intended application and use environment.

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The terminology used herein is for the purpose of describing specific exemplary embodiments only, and is not intended to limit the present disclosure. As used herein, the singular forms are intended to include the plural forms as well, unless the context clearly indicates otherwise.

The terms 'comprises' and/or 'comprising' as used herein indicate the presence of specified features, integers, steps, operations, elements, and/or components, but do not exclude the presence or addition of one or more other features, integers, steps, operations, components, and/or groups thereof.

As used in this specification, the term 'and/or' includes any one or all combinations of at least one of the associated listed items.

In this specification, the term 'connected' indicates a physical relationship between two components, for example, a relationship in which components are directly connected to each other by welding, self piercing rivet (SPR), flow drill screw (FDS), structural adhesive, or the like, or a relationship in which components are indirectly connected through one or more intermediate components.

As used herein, 'vehicle', 'vehicular', 'automotive', or other similar terms as used herein generally refer to passenger vehicles, sports cars, sport utility vehicles (SUVs), buses, trucks, and various commercial vehicles including passenger automobiles, hybrid vehicles, electric vehicles, hybrid electric vehicles, electric vehicle-based PBVs (purpose built vehicles), hydrogen-powered vehicles, and other alternative fuel vehicles (e.g., other than petroleum fuel derived from resources).

Hereinafter, embodiments of the present invention will be described in detail with reference to the accompanying drawings.

Figure 1:
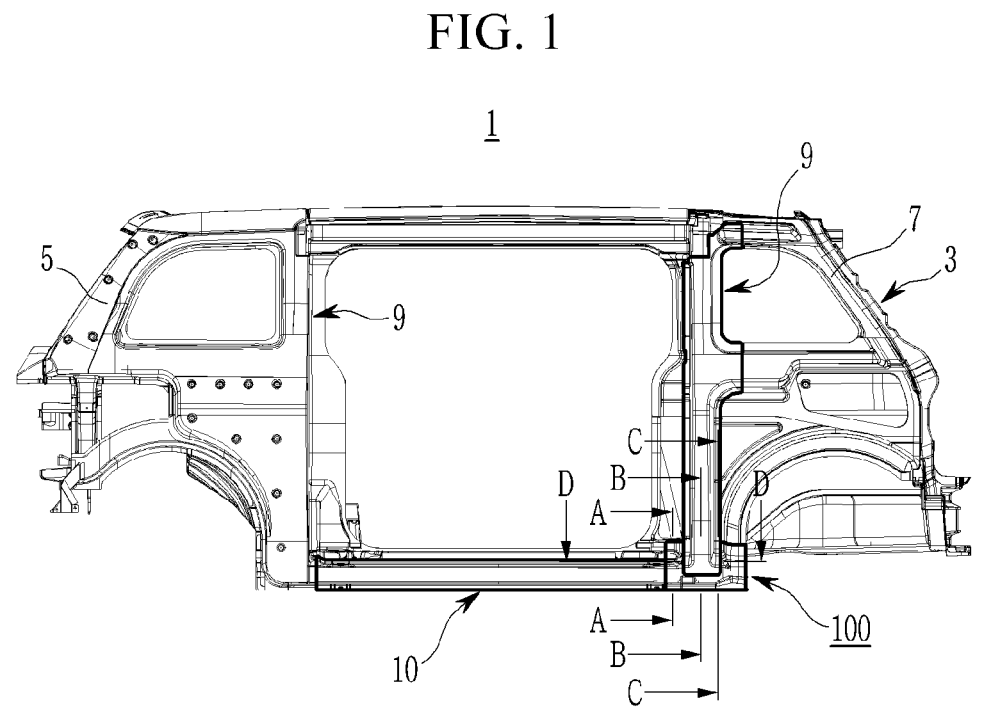

FIG. 1 is a side view illustrating an upper body for a PBV to which a rear vehicle body structure according to an exemplary embodiment is applied.

Referring to FIG. 1, a rear vehicle body structure 100 according to an exemplary embodiment may be applied to, for example, a vehicle body of a purpose-based mobility vehicle (purpose built vehicle: hereinafter referred to as a 'PBV').

In one example, the PBV may be used as an electric vehicle-based life module vehicle that provides various services to occupants while moving from one place to a destination in an unmanned self-driving manner. The life module vehicle described above is also referred to by a person of an ordinary skill in the art as a 'robo taxi', a 'robo shuttle', or a 'hailing vehicle'.

Such a PBV may be manufactured in a one box design with a large interior space. In addition, the PBV may apply a facing type seat to provide a wide interior space.

The vehicle body of the PBV includes a skateboard type under body (not shown) (commonly referred to as a 'rolling chassis' or 'chassis frame' by those skilled in the art) and an upper body 1 assembled to the under body.

The under body may be equipped with a battery assembly (not shown) and a drive motor (not shown). The upper body 1 is a body-in-white (BIW) body coupled to the under body and may constitute a cabin with a wide indoor space.

In this specification, the 'front-to-back direction of the vehicle body' may be defined as the longitudinal direction of the vehicle body, the 'vehicle width direction' may be defined as the left-right direction of the vehicle body, and the 'up-and-down direction' may be defined as the height direction of the vehicle body.

Furthermore, in this specification, 'upper end', 'upper portion', or 'upper surface' of a component indicates an end, portion, or surface of a component that is relatively upper in the drawing, and 'lower end', 'lower portion', or 'lower surface' of a component indicates an end, portion, or surface of a component that is relatively lower in the drawing.

Furthermore, in this specification, an end of a component (e.g., one end or another (other) end, etc.) denotes an end of a component in any one direction, and an end portion of the component (e.g., one end portion) or other (another) end portion, etc.) denotes a portion of a component that includes that end.

Meanwhile, the rear vehicle body structure 100 according to an exemplary embodiment may be applied to a lower structure of a side body 3 provided on both sides along the vehicle width direction in the upper body 1 as described above.

At least one door (not shown) may be mounted on such side body 3. In one example, the at least one door may include a rotatable swing door that swings along the front-to-back direction of the vehicle body.

Furthermore, the side body 3 has a structure in which a center pillar is removed to mount at least one door. To this end, the side body 3 includes a door support pillar 9 disposed along the vertical direction on a side of a front pillar 5 and a rear pillar 7, respectively.

Furthermore, the side body 3 includes a side sill 10 disposed on both sides of the vehicle body, respectively, along the front to rear direction of the vehicle body at the lower portion thereof. The door support pillar 9 is connected along the vertical direction to each of the front and rear parts of the side sill 10.

The rear vehicle body structure 100 according to an exemplary embodiment is a structure that can effectively distribute the load input to the side sill 10 while securing strength of the lower part of the side body 3.

Figure 3:
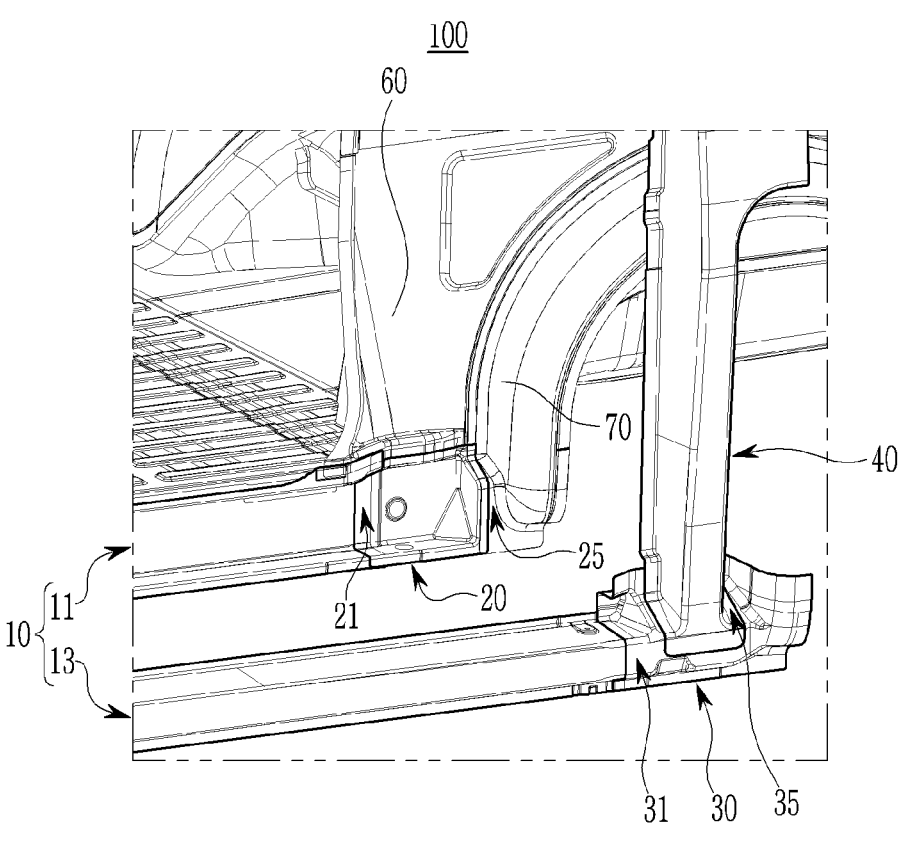
FIG. 3 and FIG. 4 are exploded perspective views showing a rear vehicle body structure according to an exemplary embodiment.
Figure 4:
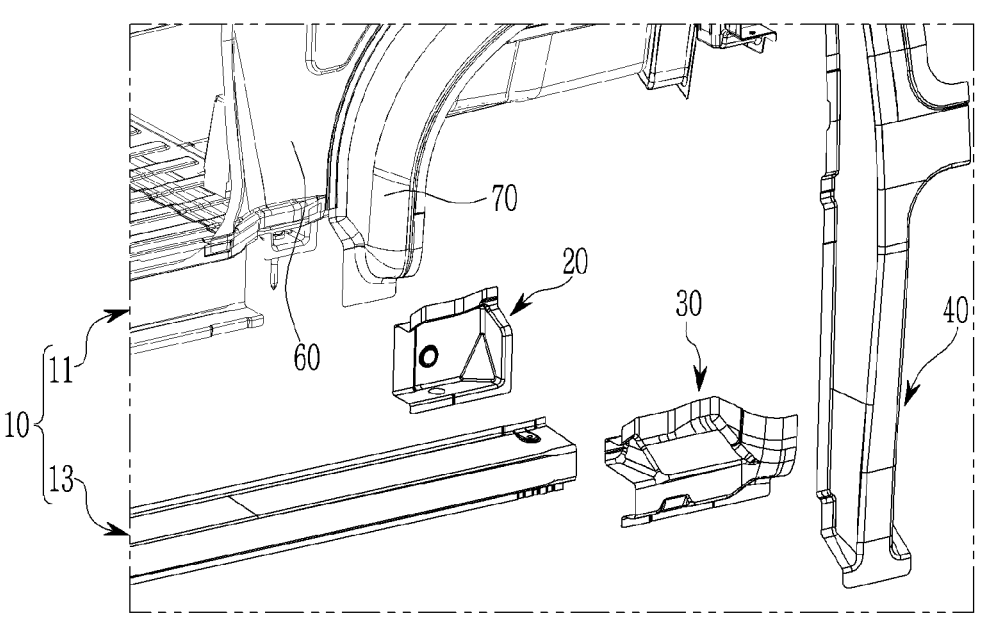

FIG. 2 is a perspective view showing a rear vehicle body structure according to an exemplary embodiment, and FIG. 3 and FIG. 4 are exploded perspective views showing a rear vehicle body structure according to an exemplary embodiment.

Referring to FIG. 2 to FIG. 4, the rear vehicle body structure 100 according to an exemplary embodiment includes a sill rear inner member 20 connected to a rear portion of the side sill 10, a sill rear outer member 30, and a pillar reinforcement member 40.

The sill rear inner member 20, the sill rear outer member 30, and the pillar reinforcement member 40 according to an exemplary embodiment are designed to secure the strength and connectivity of the rear portion of the side sill 10.

The sill rear inner member 20, the sill rear outer member 30, and the pillar reinforcement member 40 according to an exemplary embodiment as described above are combined in multiple directions along the vehicle width direction, the front to rear direction of the vehicle body, and the vertical direction at the rear of the side sill 10.

Here, the side sill 10 includes a sill inner member 11 and a sill outer member 13 connected to each other along the vehicle width direction. Each of the sill inner member 11 and the sill outer member 13 may have a cross-section shape of approximately 'U' (see FIG. 7).

The sill rear inner member 20, the sill rear outer member 30, and the pillar reinforcement member 40 according to an exemplary embodiment will be described in detail. First, the sill rear inner member 20 is connected to the rear portion of the sill inner member 11 along the front to rear direction of the vehicle body.

The sill rear inner member 20 may be connected to the rear portion of the sill inner member 11 through the front portion by welding along the vehicle width direction.

Here, the rear portion of the sill inner member 11 and the front portion of the sill rear inner member 20 may be connected by welding through the first overlap portion 21 overlapping each other along the vehicle width direction (see FIG. 3).

The rear portion of the sill rear inner member 20 is formed as a wall that blocks the 'U'-shaped cross-section of the sill inner member 11.

In an exemplary embodiment, the sill rear outer member 30 is connected to the rear portion of the sill outer member

13 along the front to rear direction of the vehicle body and is connected to the sill rear inner member 20 along the vehicle width direction.

The sill rear outer member 30 may be connected to the rear portion of the sill outer member 13 through the front portion along the vehicle width direction by welding. The upper portion of the sill rear outer member 30 is connected to the upper portion of the sill inner member 11 by welding.

Here, the rear portion of the sill outer member 13 and the front portion of the sill rear outer member 30 may be connected by welding through the second overlap portion 31 overlapping each other along the vehicle width direction (see FIG. 3).

As described above, a member assembly of the sill inner member 11 and the sill rear inner member 20 coupled to each other through the first overlap portion 21 and a member assembly of the sill outer member 13 and the sill rear outer member 30 coupled to each other through the second overlap portion 31 may be connected with each other along the vehicle width direction.

In the combination structure of the member assemblies like this, the sill inner member 11 and the sill outer member 13 are joined by welding along the vehicle width direction, and the first overlap portion 21 and the second overlap portion 31 can also be joined by welding along the vehicle width direction.

In an exemplary embodiment, as shown in FIG. 1, the pillar reinforcement member 40 is configured to form the door support pillar 9 disposed along the vertical direction on the rear pillar 7 of the side body 3.

The pillar reinforcement member 40 is connected to the sill rear outer member 30 and disposed along the vertical direction of the vehicle body. The pillar reinforcement member 40 may be connected with the sill rear outer member 30 by welding through a joint flange formed at the lower portion.

Figure 5:
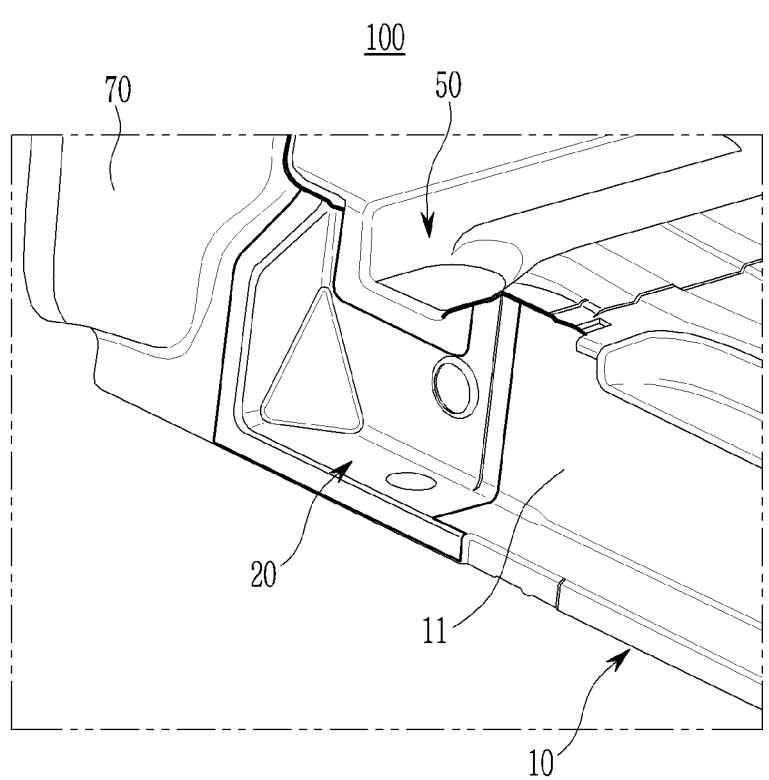
FIG. 5 is a drawing showing a rear cross member applied to a rear vehicle body structure according to an exemplary embodiment.

FIG. 5 is a drawing showing a rear cross member applied to a rear vehicle body structure according to an exemplary embodiment.

Meanwhile, as shown in FIG. 5, the rear vehicle body structure 100 according to an exemplary embodiment further includes a rear cross member 50.

The rear cross member 50 may be connected to the sill rear inner member 20 by welding along the vehicle width direction.

As shown in FIG. 2 to FIG. 4, the rear vehicle body structure 100 according to an exemplary embodiment of the present invention further includes a rear pillar panel 60.

As shown in FIG. 2, the rear pillar panel 60 is configured to form the door support pillar 9 disposed along the vertical direction on the rear pillar 7 of the side body 3.

The rear pillar panel 60 is connected to the upper portion of the rear portion of the sill inner member 11 and the upper portion of the sill rear inner member 20 and may be connected to the pillar reinforcement member 40 by welding along the vehicle width direction.

Figure 6A:
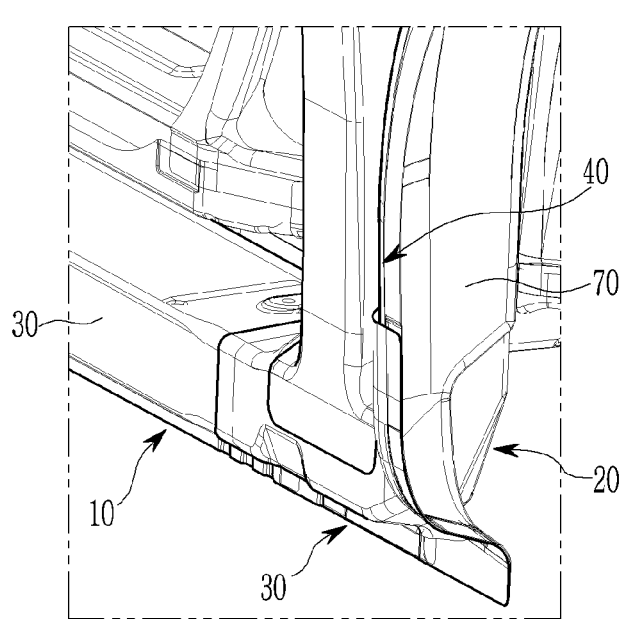
FIG. 6A and FIG. 6B are drawings showing a rear wheel arch member applied to a rear vehicle body structure according to an exemplary embodiment.
Figure 6B:
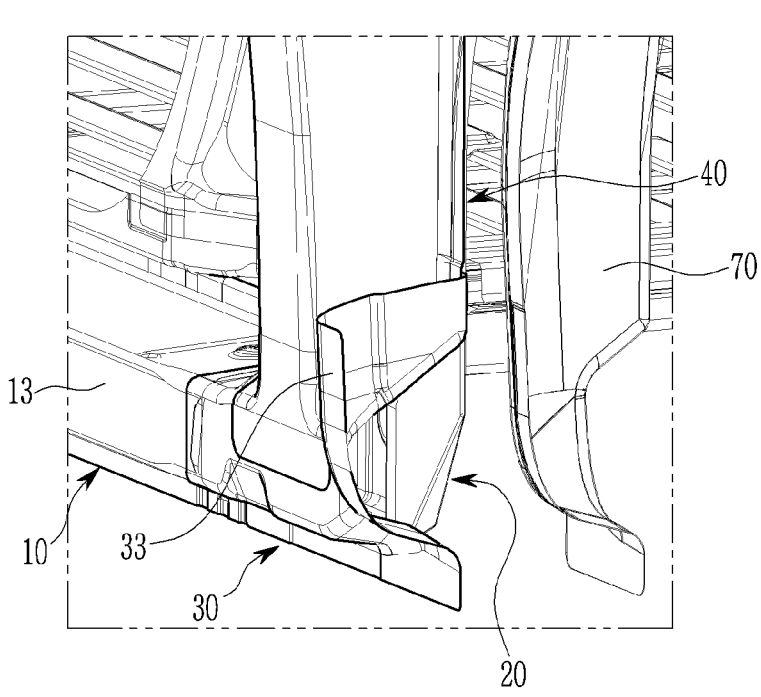

FIG. 6A and FIG. 6B are drawings showing a rear wheel arch member applied to a rear vehicle body structure according to an exemplary embodiment.

The rear vehicle body structure 100 according to an exemplary embodiment of the present invention further includes a rear wheel arch member 70.

The rear wheel arch member 70 may be connected to the sill rear inner member 20 and the sill rear outer member 30 by welding. To this end, the sill rear outer member 30 includes a forming part 33 connected with the rear wheel arch member 70. The forming part 33 is formed in a shape corresponding to the lower portion of the rear wheel arch member 70 at the rear portion of the sill rear outer member 30.

As shown in FIG. 3, the rear portion of the sill rear inner member 20 and the lower portion of the rear wheel arch member 70 may be connected by welding through a third overlap portion 25 overlapping each other along the vehicle width direction. Also, the rear portion of the sill rear outer member 30 and the rear portion of the pillar reinforcement member 40 may be connected by welding through a fourth overlap portion 35 overlapping each other along the vehicle width direction. Furthermore, the third overlap portion 25 and the fourth overlap portion 35 as described above may be connected by welding along the vehicle width direction.

Hereinafter, the cross-section connection structure of the sill rear inner member 20, the sill rear outer member 30, and the pillar reinforcement member 40 will be described.

Figure 7:
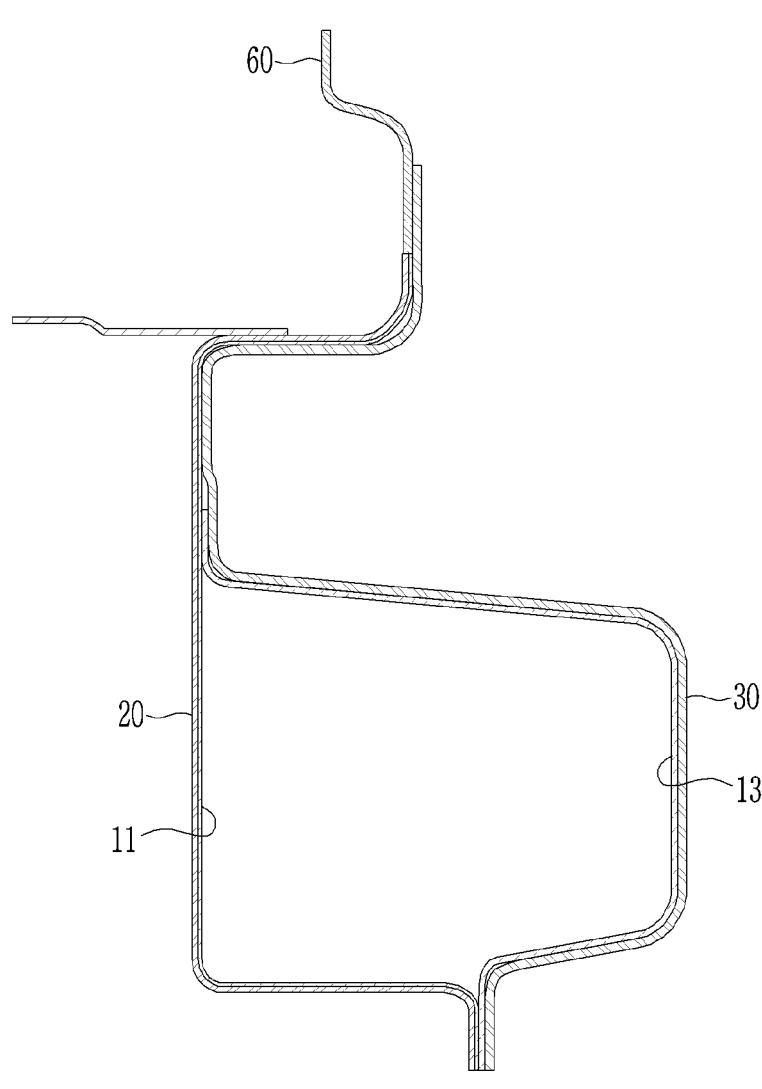
FIG. 7 is a cross-sectional view along line A-A in FIG. 1.
Figure 8:
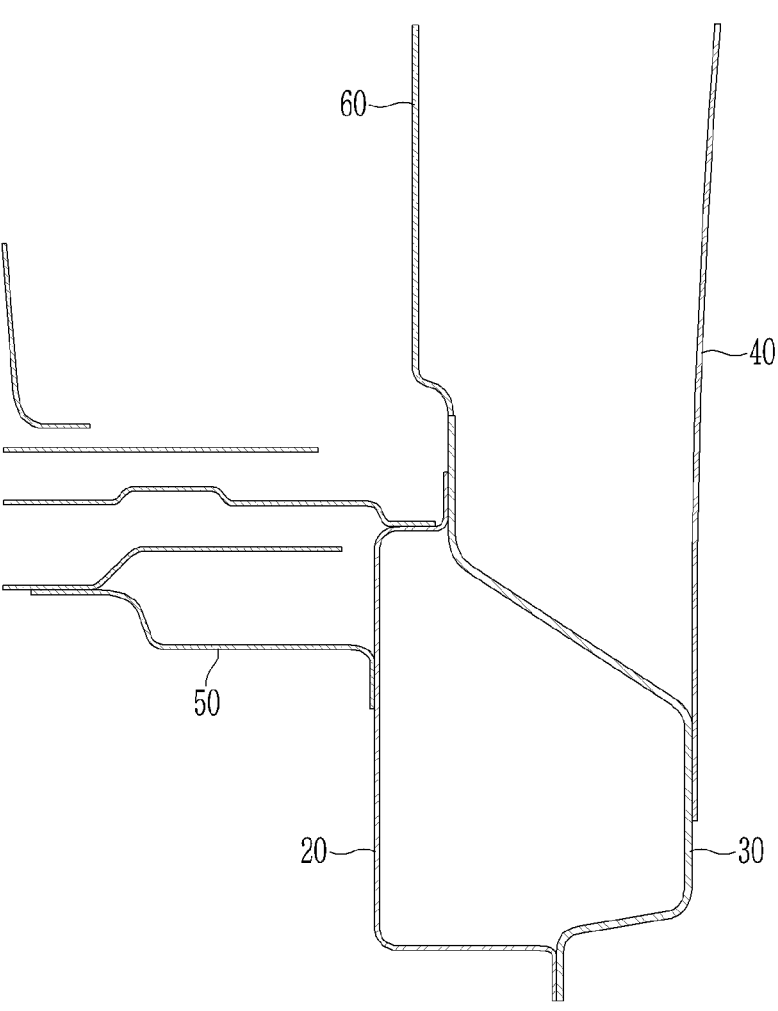
FIG. 8 is a cross-sectional view along line B-B in FIG. 1.

FIG. 7 is a cross-sectional view along line A-A in FIG. 1, and FIG. 8 is a cross-sectional view along line B-B in FIG. 1.

Figure 9:
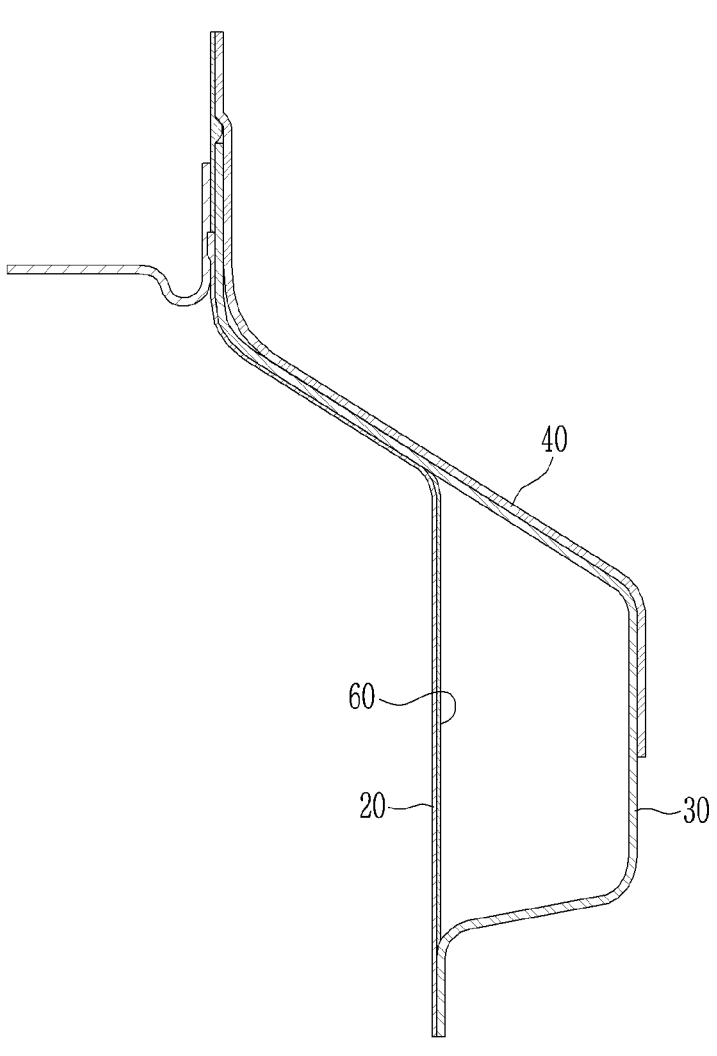
FIG. 9 is a cross-sectional view along line C-C in FIG. 1.
Figure 10:
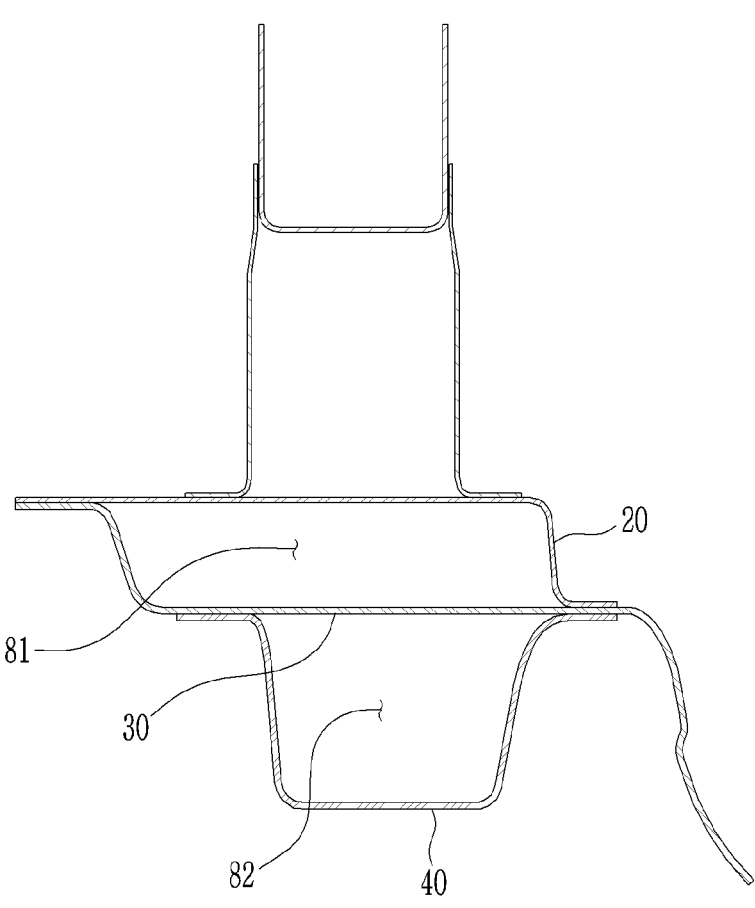
FIG. 10 is a cross-sectional view along line D-D in FIG. 1.

FIG. 9 is a cross-sectional view along line C-C in FIG. 1, and FIG. 10 is a cross-sectional view along line D-D in FIG. 1.

In an exemplary embodiment, the sill rear inner member 20 and the sill rear outer member 30 are connected along the vehicle width direction to form a closed cross-section as shown in FIG. 7 to FIG. 9.

In addition, in the exemplary embodiment of the present invention, as shown in FIG. 10, the sill rear outer member 30 and the pillar reinforcement member 40 are connected to form a closed cross section.

Furthermore, the sill rear inner member 20, the sill rear outer member 30, and the pillar reinforcement member 40 are connected along the vehicle width direction to form a double closed cross-section shape.

More specifically, the sill rear inner member 20 and the sill rear outer member 30 are connected to form a first closed section 81. In addition, the sill rear outer member 30 and the pillar reinforcement member 40 are connected to form a second closed section 82.

Here, on both sides of the vehicle, the first closed section 81 and the second closed section 82 are each partitioned and formed in a shape in which the sill rear outer member 30 is disposed between the sill rear inner member 20 and the pillar reinforcement member 40.

Hereinafter, an assembly example of the rear vehicle body structure 100 according to an embodiment of the present invention will be described.

First, the front portion of the sill rear inner member 20 is connected to the rear portion of the sill inner member 11. The front portion of the sill rear outer member 30 is connected to the rear portion of the sill outer member 13. Furthermore, the pillar reinforcement member 40 is connected along the vertical direction to the sill rear outer member 30.

In this state, the sill inner member 11 and the sill outer member 13 are connected to each other along the vehicle width direction. Also, the sill rear inner member 20 and the sill rear outer member 30 are connected to each other along the vehicle width direction.

Furthermore, the rear cross member 50 is connected to the sill rear inner member 20. And the rear pillar panel 60 is connected to the upper portion of the rear portion of the sill inner member 11 and the upper portion of the sill rear inner member 20. The rear pillar panel 60 is combined with the pillar reinforcement member 40. In addition, the rear wheel arch member 70 is coupled to the sill rear inner member 20 and the sill rear outer member 30.

According to the rear vehicle body structure 100 according to an exemplary embodiment of the present invention, the sill rear inner member 20, the sill rear outer member 30, and the pillar reinforcement member 40 are multiply connected along the width direction, the front to rear direction, and the vertical direction of the vehicle body.

The sill rear inner member 20 and the sill rear outer member 30 are connected in a closed cross-section shape to form the first closed section 81. The sill rear outer member 30 and the pillar reinforcement member 40 are connected in a closed cross-section shape to form the second closed section 82 adjacent to the first closed section 81.

As described so far, the rear vehicle body structure 100 according to an exemplary embodiment reinforces the cross-section connectivity of the sill rear inner member 20, the sill rear outer member 30, and the pillar reinforcement member 40 coupled to the rear part of the side sill 10, and secures strength of the lower part of the side body 3.

Therefore, the rear vehicle body structure 100 according to an exemplary embodiment can effectively distribute impact loads (e.g., front, rear, and side impact loads) of at least one swing door input to the side sill 10.

Thus, the rear vehicle body structure 100 according to an exemplary embodiment can improve the strength and connectivity of the rear part of the side sill 10 and improve the crash performance of the PBV.

Furthermore, the rear vehicle body structure 100 according to an exemplary embodiment can improve connectivity, strength, durability, impact absorption, and NVH performance of a vehicle body having a one box design.

While embodiments of this invention have been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A rear vehicle body structure, the structure comprising:
   a side sill comprising a sill inner member and a sill outer member connected to each other, the side sill extending along a front to rear direction of a vehicle body at a lower portion of a side body;
   a sill rear inner member connected to a rear portion of the sill inner member along the front to rear direction of the vehicle body;
   a sill rear outer member connected to a rear portion of the sill outer member along the front to rear direction of the vehicle body and connected to the sill rear inner member along a vehicle width direction;
   a rear wheel arch member connected to the sill rear inner member and the sill rear outer member, wherein the sill rear outer member comprises a forming part on a rear portion of the sill rear outer member, the forming part being connected with the rear wheel arch member; and
   a pillar reinforcement member connected to the sill rear outer member and disposed along a vertical direction of the vehicle body.

2. The structure of claim 1, wherein the sill rear inner member, the sill rear outer member, and the pillar reinforcement member are multiply connected along the vehicle width direction, the front to rear direction, and the vertical direction of the vehicle body.

3. The structure of claim 1, further comprising a rear cross member connected to the sill rear inner member along the vehicle width direction.

4. The structure of claim 1, further comprising a rear pillar panel connected to an upper portion of the rear portion of the sill inner member and an upper portion of the sill rear inner member and connected to the pillar reinforcement member along the vehicle width direction.

5. The structure of claim 1, wherein the sill rear inner member and the sill rear outer member are connected to define a closed cross-section.

6. The structure of claim 1, wherein the sill rear outer member and the pillar reinforcement member are connected to define a closed cross-section.

7. The structure of claim 1, wherein:

the rear portion of the sill inner member and a front portion of the sill rear inner member are connected through a first overlap portion overlapping each other along the vehicle width direction;

the rear portion of the sill outer member and a front portion of the sill rear outer member are connected through a second overlap portion overlapping each other along the vehicle width direction; and the first overlap portion and the second overlap portion are connected to each other along the vehicle width direction.

8. The structure of claim 7, wherein:

a rear portion of the sill rear inner member and a lower portion of the rear wheel arch member are connected through a third overlap portion overlapping each other along the vehicle width direction;

the rear portion of the sill rear outer member and a rear portion of the pillar reinforcement member are connected through a fourth overlap portion overlapping each other along the vehicle width direction; and the third overlap portion and the fourth overlap portion are connected to each other along the vehicle width direction.

9. The structure of claim 1, wherein the sill rear inner member, the sill rear outer member, and the pillar reinforcement member define a double closed cross-section shape along the vehicle width direction.

10. The structure of claim 1, wherein the sill rear inner member and the sill rear outer member are connected by welding through overlap portions that overlap each other along the vehicle width direction.

11. The structure of claim 1, wherein the pillar reinforcement member is configured to form a door support pillar disposed along the vertical direction on a rear pillar of the side body.

12. A rear vehicle body structure, the structure comprising:

a side sill comprising a sill inner member and a sill outer member connected to each other, the side sill extending along a front to rear direction of a vehicle body at a lower portion of a side body;

a sill rear inner member connected to a rear portion of the sill inner member along the front to rear direction of the vehicle body;

a sill rear outer member connected to a rear portion of the sill outer member along the front to rear direction of the vehicle body and connected to the sill rear inner member along a vehicle width direction, wherein the sill rear inner member and the sill rear outer member are connected to define a first closed section; and a pillar reinforcement member connected to the sill rear outer member and disposed along a vertical direction of the vehicle body, wherein the sill rear outer member and the pillar reinforcement member are connected to define a second closed section, and wherein the first closed section and the second closed section are each partitioned and formed in a shape in which the sill rear outer member is disposed between the sill rear inner member and the pillar reinforcement member.

13. The structure of claim 12, wherein the sill rear outer member includes a forming part that is shaped to correspond with a lower portion of a rear wheel arch member for connection therewith.

14. A vehicle comprising:

a vehicle body comprising a pair of side bodies disposed on opposite sides of the vehicle body in a vehicle width direction;

a pair of side sills each comprising a sill inner member and a sill outer member connected to each other, the pair of side sills being disposed on both sides of the vehicle body and extending along a front to rear direction of the vehicle body at lower portions of the pair of side bodies, respectively;

a pair of sill rear inner members connected to rear portions of each of the sill inner members, respectively;

a pair of sill rear outer members connected to rear portions of each of the sill outer members, respectively, and connected to each of the sill rear inner members, respectively;

a pair of pillar reinforcement members connected to each of the sill rear outer members, respectively, the pillar reinforcement members being disposed along a vertical direction of the vehicle body; and a pair of rear wheel arch members on each side of the vehicle body, each rear wheel arch member being connected to the sill rear inner member and the sill rear outer member on a same side of the vehicle body, wherein on each side of the vehicle body:

a rear portion of the sill rear inner member and a lower portion of the rear wheel arch member are connected through a third overlap portion overlapping each other along the vehicle width direction;

a rear portion of the sill rear outer member and a rear portion of the pillar reinforcement member are connected through a fourth overlap portion overlapping each other along the vehicle width direction; and the third overlap portion and the fourth overlap portion are connected to each other along the vehicle width direction.

15. The vehicle of claim 14, wherein the sill rear inner members, the sill rear outer members, and the pillar reinforcement members are multiply connected along the vehicle width direction, the front to rear direction, and the vertical direction of the vehicle body.

16. The vehicle of claim 14, further comprising a pair of rear cross members respectively connected to the sill rear inner members along the vehicle width direction.

17. The vehicle of claim 14, further comprising a pair of rear pillar panels connected to upper portions of the rear portions of the sill inner members and upper portions of the sill rear inner members, respectively, and connected to the pillar reinforcement members, respectively, along the vehicle width direction.

18. The vehicle of claim 14, further comprising a pair of rear wheel arch members each respectively connected to the sill rear inner members and the sill rear outer members.

19. The vehicle of claim 14, wherein, on each side of the vehicle body:

the rear portion of the sill inner member and a front portion of the sill rear inner member are connected through a first overlap portion overlapping each other along the vehicle width direction;

the rear portion of the sill outer member and a front portion of the sill rear outer member are connected through a second overlap portion overlapping each other along the vehicle width direction; and the first overlap portion and the second overlap portion are connected to each other along the vehicle width direction.

20. The vehicle of claim 14, wherein each of the pair of rear wheel arch members includes a forming part configured to be connected with a rear wheel arch structure, and wherein the forming parts are positioned at rear portions of the sill rear outer members.

* * * * *